Oct. 18, 1966  J. W. ORENDORFF  3,279,822
HYDRAULIC HOSE SUPPORT
Filed Nov. 9, 1964  2 Sheets-Sheet 1
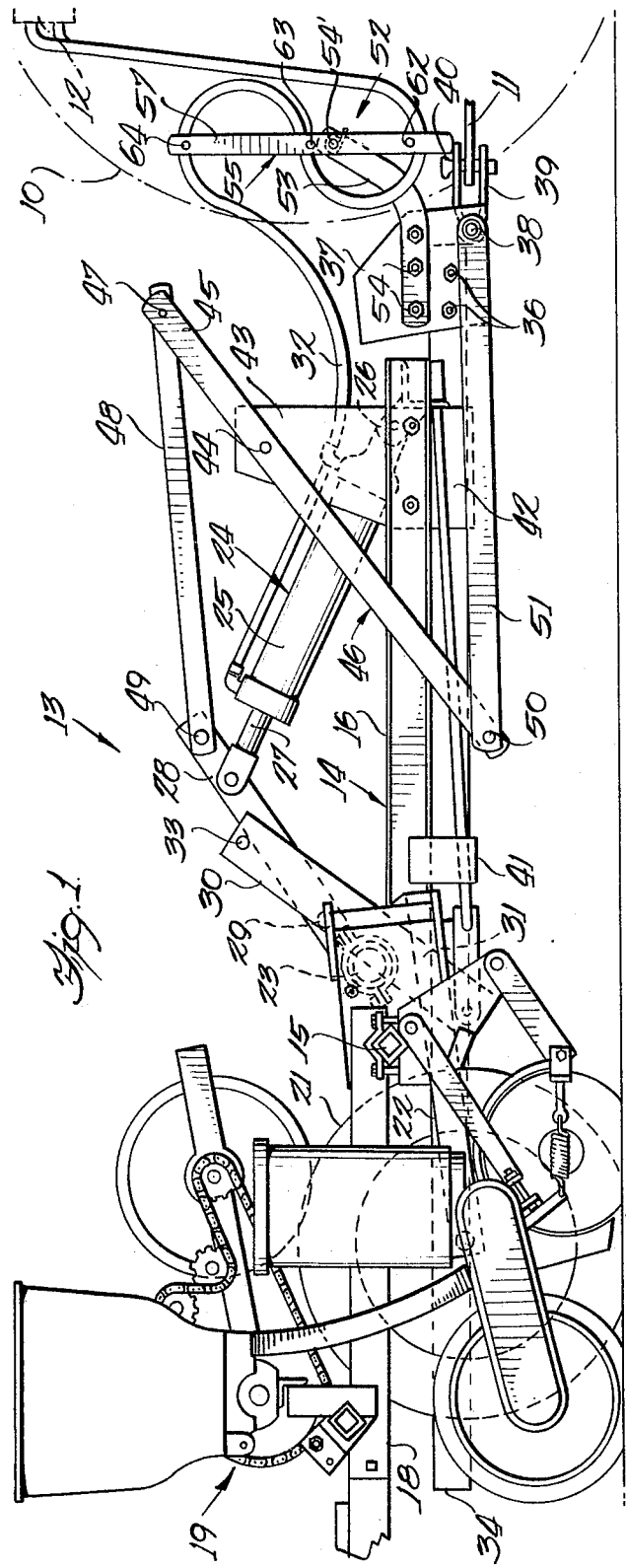
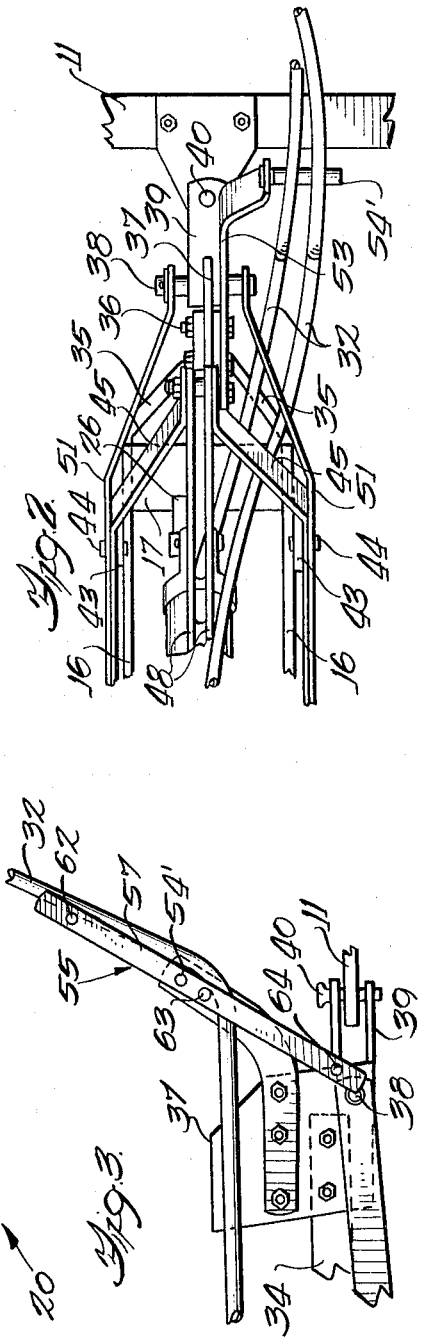
Inventor
John W. Orendorff
J K McNeill
Attorney

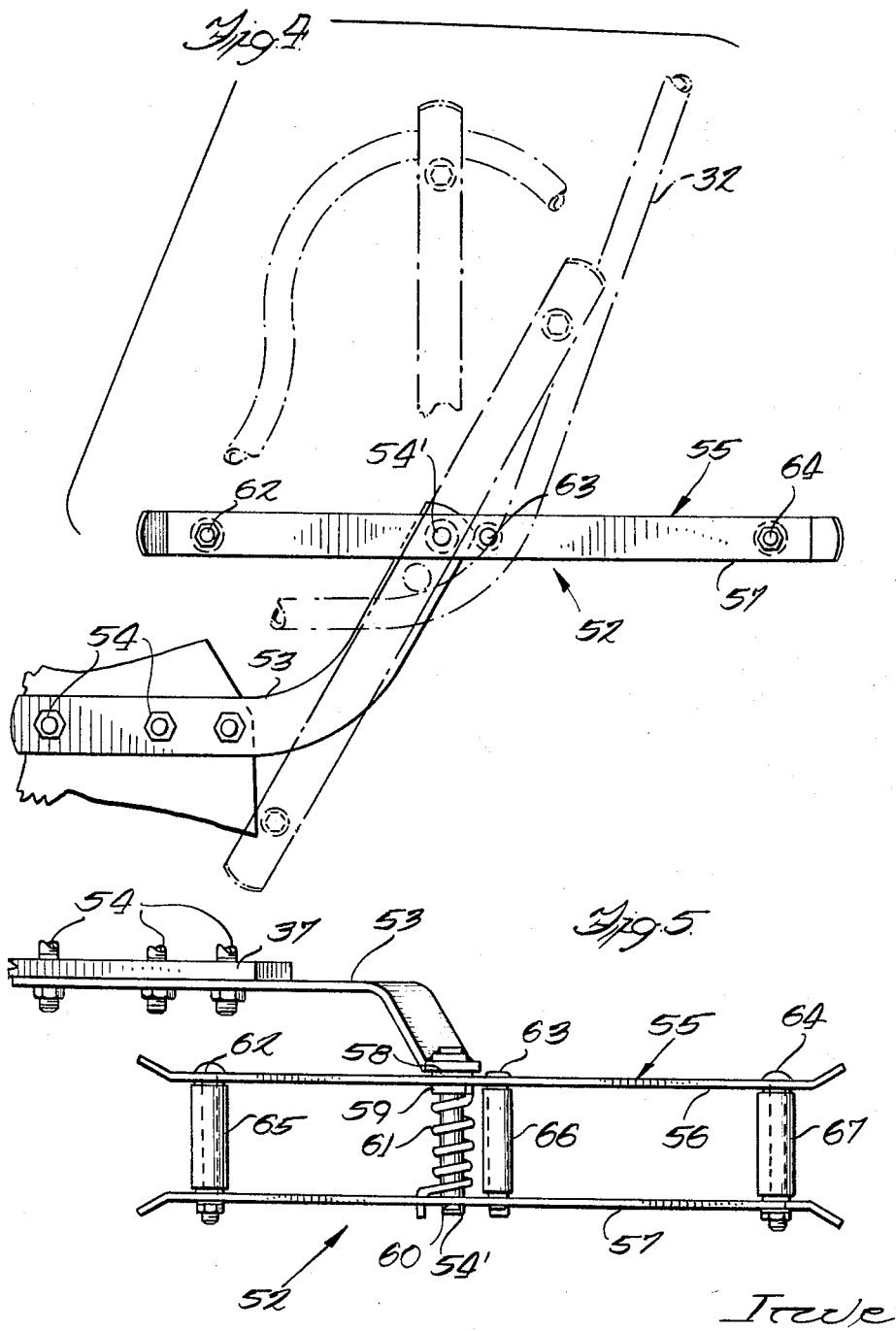

United States Patent Office 3,279,822
Patented Oct. 18, 1966

3,279,822
HYDRAULIC HOSE SUPPORT
John W. Orendorff, Downers Grove, Ill., assignor to International Harvester Company, a corporation of Delaware
Filed Nov. 9, 1964, Ser. No. 409,683
7 Claims. (Cl. 280—421)

This invention relates to trailing devices such as implements and particularly to implements controlled by hydraulic fluid under pressure transmitted through flexible tubing or hose. Implements such as those used for earth-working purposes frequently have moving parts operated by hydraulic cylinders and the like and are propelled by a tractor having a source of fluid under pressure supplied to the cylinder through flexible hose connections between the tractor and implement. Movement between the implement and the tractor often damages the hose, particularly where longitudinal movement occurs between the implement and tractor. Therefore, the present invention has for its object the provision of novel means for maintaining the hydraulic hose extending between a tractor and implement under tension at all times to minimize the danger of the hose becoming pinched or broken.

Another object of the invention is the provision of novel take-up means for flexible tubing extending between an implement and its propelling vehicle to prevent the introduction of slack into the hose and the consequent danger of damage thereto.

Other objects and advantages of the invention will become clear from the following detailed description when read in conjunction with the accompanying drawings, wherein:

FIGURE 1 is a view in side elevation showing an implement connected to a tractor and illustrating apparatus according to this invention for taking-up slack in flexible hydraulic tubing extending between a tractor and an implement;

FIGURE 2 is a plan view of a detail, with parts removed, of a portion of the structure shown in FIGURE 1;

FIGURE 3 is a view in side elevation of a detail, on an enlarged scale, showing the slack take-up apparatus of FIGURE 1 in a different position;

FIGURE 4 is an enlarged detail showing one solid line and two dotted line positions of the take-up apparatus of this invention; and FIGURE 5 is a plan view of the structure shown in FIGURE 4.

The numeral 10 designates a tractor having a drawbar 11 and a source of fluid under pressure 12. Although the invention is applicable to other devices hitched to a propelling vehicle, the device shown in the drawings is a planter 13 of the trailing type having a supporting frame 14 including a transversely extending tool bar 15 to the lower side of which are affixed spaced forwardly extending bars 16 forming a hitch, and the forward ends of which are connected by a web 17.

The transverse tool bar 15 forms part of a planter frame including rearwardly extending laterally spaced bars 18 secured to the top of tool bar 15 and upon which are mounted laterally spaced fertilizer units 19, a seed planting assembly 20 being provided for each fertilizer unit and mounted on the tool bar 15. It may be understood that the constructional details of the seed planting and fertilizer depositing units form no part of this invention and for the purposes thereof may be regarded as of any well known type. Further details regarding the implement 13 may be had by reference to co-pending U.S. application Serial No. 399,539, filed September 28, 1964.

The implement supporting frame 14 is mounted on laterally spaced ground-engaging wheels 21, only one of which is shown, and each of which is carried by rearwardly and downwardly extending arms 22, the forward ends of which are affixed to a rockshaft 23 extending transversely parallel to tool bar 15 and affixed thereto by means not shown.

By rocking shaft 23, arms 22 and wheel 21 are swung in a vertical plane about the axis of the shaft, swinging the wheel arms counterclockwise from the position in FIGURE 1 raising the implement to a non-operating position. Rocking of shaft 23 to raise and lower the implement is accomplished by the provision of a hydraulic jack 24 comprising a cylinder 25 pivotally connected to a bracket 26 mounted on the cross member 17 of the hitch, and a piston rod 27 slidable in the cylinder and pivotally connected to a link 28, the lower end of which is pivoted at 29 between the spaced arms of a lever 30 affixed to the tubular members 23 and having a portion 31 projecting therebelow.

Fluid under pressure is supplied to cylinder 25 from the source 12 on the tractor through hose lines 32 to extend and retract the rod 27 in the cylinder. Extension of the rod in the cylinder causes link 28 to engage a pin 33 at the upper end of lever 30 and rock the lever in a counterclockwise direction to swing the wheel arms 22 downwardly relative to the implement frame and vertically move the planter structure to a transport position. Retraction of the piston rod in the cylinder causes the implement to lower to the operating position of FIGURE 1. An auxiliary hitch frame 34 comprises laterally spaced bar 35, the forward ends of which, as shown in FIGURE 2, converge and are secured by bolts 36 to an upright hitch plate 37. Hitch plate 37 carries at its lower end a pivot pin 38 upon which is mounted a clevis 39 connected by a vertical pivot pin 40 to the drawbar 11 of the tractor.

Auxiliary hitch frame 34 extends rearwardly and the side bars 35 thereof are disposed parallel to and below the side bars 16 of hitch frame 14. These side bars rest and are slidably received in hangers 41, which are U-shaped to receive the bars and are secured to bars 16. The forward ends of the bars are likewise received in a similar bracket 42 secured to and depending from bars 16.

Upper extensions 43 of brackets 42 are provided with pivot pins 44 upon which are mounted laterally spaced members 45 forming a lever designated by the numeral 46. The upper ends of arms 45 converge and are provided with pivot pin 47 upon which is mounted a rearwardly extending link 48 comprising laterally spaced apart members straddling the upper end of link 28 and mounted on a pivot pin 49.

The lower ends of members 45 are pivotally connected by bolts 50 to the rear ends of forwardly extending links 51, the forward ends of which are mounted upon the pivot pin 38 through which draft is transmitted from the tractor to the implement.

When the implement is raised to its transport position rod 27 is extended in cylinder 25 to rock link 28 and lever 30 counterclockwise about the axis of shaft member 23. This rocks wheel arms 22 downwardly and simultaneously rocks lever 46 about the axis of pin 44. The effect of this is to cause hitch links 51 to move forwardly with respect to the implement while links 48 move rearwardly, thus causing the implement frame 14 to move rearwardly with respect to tractor 10 and increase the distance therebetween. This is the transport position of the implement with the earth-working units raised out of the ground. To bring the implement frame closer to the tractor during operation, retraction of piston rod 27 swings wheels 21 upwardly and lowers the frame to the position shown in FIGURE 1. Lever 46 is swung clockwise, exerting a force in a direction to telescope auxiliary frame 34 in guide members 41 and 42, moving links 48 forwardly with respect to links 51 to decrease the distance of the implement behind the tractor for the reasons hereinbefore set forth, and as more fully explained in co-pending U.S. application Serial No. 399,539, filed September 28, 1964.

Inasmuch as the hydraulic ram 24 is mounted on the implement frame which moves longitudinally relative to the tractor, and the ram is connected to the power source 12 on the tractor through flexible hose lines 32, it is readily understood that precautions must be taken to avoid damage to the flexible hose during telescoping of the implement with respect to the tractor. Slack in the hose is taken up by the provision of a reel assembly 52 comprising a bracket 53 secured by bolts 54 to plate 37 and having its forward end extending laterally and upwardly and carrying a pin 54' at its upper end. Pin 54' serves as the fulcrum of a reel 55, shown in FIGURES 1, 3, 4 and 5, and comprising spaced bars 56 and 57, bar 55 being confined between a pair of collars 58 and 59, secured to pin 54', and bar 57 engaging a cotter key 60 at the other end of the pin.

Reel 55 is mounted for free rotation on pin 54' but is yieldably restrained therefrom by a torsion spring 61 surrounding pin 54' between bars 56 and 57 and having one end anchored in a suitable aperture provided in collar 59, and the other end being received in an opening in bar 57.

Bolts 62, 63 and 64 are mounted at spaced locations in registering openings provided in bars 56 and 57 and spacers 65, 66 and 67 are rotatably mounted, respectively, thereon.

In FIGURE 3, the reel 55 is shown in the position it occupies when the implement is in its transport position and spaced its furthest distance from the tractor 10. The hose lines 32 from the tractor are wound or threaded into the reel with the hose engaging bolts 62 and 63. In this position, the reel is urged by the bias in spring 61 to revolve in a clockwise direction as viewed in FIGURES 1, 3 and 4. Upon telescoping the implement toward the tractor for operation by retracting the hydraulic ram 24, reel 55 revolves in a clockwise direction until spacer 67 on bolt 64 engages the hose lines, revolving to the upright position of FIGURE 1 with the hose assuming a sinuous or S-shape.

It is believed that the construction and operation of the novel hydraulic hose support of this invention will be clearly understood from the foregoing description. It should likewise be understood that the invention has been described in its preferred embodiment and that modifications may be made therein without departing from the spirit of the invention or the scope of the appended claims.

The embodiments of the invention for which an exclusive property or privilege is claimed are defined as follows:

1. A support and slack take-up device for a flexible hydraulic hose extending from a tractor to an implement having a hydraulic cylinder thereon receiving fluid under pressure through said hose, wherein movement of the implement between operating and transport positions includes longitudinal movement of the implement with respect to the tractor, comprising reel means adapted to be pivotally mounted medially of its ends on the implement and swingable about a transverse axis in response to said longitudinal movement of the implement, and means forming a slidable connection between a section of said hose and said reel means at a plurality of locations lengthwise of the latter, said reel means being swingable in one direction with said hose section about said transverse axis upon advance of the implement toward the tractor to wind up the hose on the reel means.

2. A support and slack take-up device for a flexible hydraulic hose extending from a tractor to an implement having a hydraulic cylinder thereon receiving fluid under pressure through said hose, wherein movement of the implement between operating and transport positions includes longitudinal movement of the implement with respect to the tractor, comprising reel means adapted to be pivotally mounted medially of its ends on the implement and swingable about a transverse axis in response to said longitudinal movement of the implement, and means forming a slidable connection between a section of said hose and said reel means at a plurality of locations lengthwise of the latter, said reel means being swingable in one direction with said hose section about said transverse axis upon advance of the implement toward the tractor to wind up the hose on the reel means, the mounting of said reel means including spring means biasing said reel means to swing in said one direction about said transverse axis.

3. The invention set forth in claim 2, wherein said reel means comprises an elongated member having a hose-engaging element at each end engageable, respectively, with opposite sides of said hose, upon rotation of said reel means in said one direction, to impart a sinuous conformation to the hose.

4. The invention set forth in claim 3, wherein said reel means comprises a pair of elongated members spaced at their ends by rollers having rolling engagement with said hose.

5. In an implement adapted for attachment to a tractor having a drawbar and a source of fluid under pressure, said implement including a tool-carrying frame and a part movable relative thereto to raise and lower said frame, the combination of a hydraulic cylinder mounted on said frame and operatively connected to said movable part for moving the latter relative to the frame, flexible tubing extending between and connecting said cylinder to said fluid source on the tractor, hitch means carried by said frame including a rear section mounted on the tool-carrying frame and a forward section connected to said drawbar, said sections being relatively longitudinally movable to alternately increase and decrease the distance between the tractor and said tool-carrying frame, means forming an operating connection between said part and said hitch sections for relatively moving said sections in response to the movement of said part, and reel means rotatably mounted on one of said sections having a winding association with said tubing and rotatable to take up slack in said tubing when said hitch sections are relatively moved to shorten the distance between the tractor and said tool-carrying frame.

6. The invention set forth in claim 5, wherein the means for mounting said reel means on said one of said hitch sections includes spring means biasing said reel means to rotate in one direction.

7. The invention set forth in claim 6, wherein said reel means is pivoted medially of its ends on said one of said hitch sections and is provided with means at its ends engageable at longitudinally spaced locations with said tubing.

References Cited by the Examiner
UNITED STATES PATENTS

| | | | |
|---|---|---|---|
| 2,619,888 | 12/1952 | Young et al. | 280—421 |
| 2,626,552 | 1/1953 | Oehler et al. | 280—421 |
| 2,717,136 | 9/1955 | Greeson | 248—75 |
| 2,856,016 | 10/1958 | Lindeman | 280—421 |

LEO FRIAGLIA, *Primary Examiner.*